(12) United States Patent
Meng et al.

(10) Patent No.: US 10,200,682 B2
(45) Date of Patent: Feb. 5, 2019

(54) ACTIVE GRATING, THREE-DIMENSIONAL DISPLAY DEVICE AND THREE-DIMENSIONAL DISPLAY METHOD

(71) Applicants: BOE TECHNOLOGY GROUP CO., LTD., Beijing (CN); BEIJING BOE DISPLAY TECHNOLOGY CO., LTD., Beijing (CN)

(72) Inventors: Zhiming Meng, Beijing (CN); Weihao Hu, Beijing (CN); Zhimin Ma, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 69 days.

(21) Appl. No.: 14/773,012

(22) PCT Filed: Dec. 11, 2014

(86) PCT No.: PCT/CN2014/093616
§ 371 (c)(1),
(2) Date: Sep. 4, 2015

(87) PCT Pub. No.: WO2016/019671
PCT Pub. Date: Feb. 11, 2016

(65) Prior Publication Data
US 2016/0198150 A1 Jul. 7, 2016

(30) Foreign Application Priority Data
Aug. 8, 2014 (CN) .......................... 2014 1 0390048

(51) Int. Cl.
*H04N 13/31* (2018.01)
*G02B 27/22* (2018.01)
(Continued)

(52) U.S. Cl.
CPC .......... *H04N 13/366* (2018.05); *G02B 27/22* (2013.01); *G02B 27/2214* (2013.01);
(Continued)

(58) Field of Classification Search
CPC ............... G02F 1/134309; G02F 1/163; G02F 1/13306; H04N 13/0468; H04N 13/0404; G02B 27/22
See application file for complete search history.

(56) References Cited

U.S. PATENT DOCUMENTS

2007/0183015 A1  8/2007  Jacobs et al.
2008/0088753 A1* 4/2008  Chestak ............... G02B 27/225
                                                                349/15
(Continued)

FOREIGN PATENT DOCUMENTS

CN   102033324 A   4/2011
CN   102122077 A   7/2011
(Continued)

OTHER PUBLICATIONS

International Search Report and Written Opinion both dated May 13, 2015; Appln. No. PCT/CN2014/093616.
(Continued)

*Primary Examiner* — Dung Nguyen
(74) *Attorney, Agent, or Firm* — Ladas & Parry LLP

(57) ABSTRACT

An active grating, a three-dimensional display device and a three-dimensional display method are provided. The three-dimensional display device comprises: a display panel (1) and an active grating (2) disposed oppositely; a face recognition module, configured to acquire a distance from a current viewer to the active grating (2); a first calculating module, in signal connection with the face recognition module, configured to calculate a theoretical horizontal
(Continued)

width of each of the light shielding regions (21) when the current viewer see an ideal 3D image at a current position, according to the distance acquired by the face recognition module and a first corresponding relationship between the distance from the current viewer to the active grating and the theoretical horizontal width of each of the light shielding region of the active grating when the current viewer see the ideal 3D image; and an adjusting module, in signal connection with the first calculating module and a driving circuit of the active grating respectively, configured to send a corresponding first control instruction to the driving circuit according to the theoretical horizontal width calculated by the first calculating module so as to adjust an actual horizontal width of each of the light shielding regions (21) of the active grating, so that the actual horizontal width equals to the theoretical horizontal width. The three-dimensional display device provided by embodiments of the invention can change the viewing region position according to position coordinates of the viewer, so that the ideal 3D image can be seen by the viewer not positioned at a fixed viewing region position, thus, improving practicality of the three-dimensional display device obviously.

17 Claims, 4 Drawing Sheets

(51) Int. Cl.
| | |
|---|---|
| *G02F 1/133* | (2006.01) |
| *H04N 13/366* | (2018.01) |
| *H04N 13/305* | (2018.01) |
| *G02F 1/1343* | (2006.01) |
| *G02F 1/155* | (2006.01) |
| *G02F 1/29* | (2006.01) |
| *G02F 1/163* | (2006.01) |

(52) U.S. Cl.
CPC .... *G02F 1/13306* (2013.01); *G02F 1/134309* (2013.01); *G02F 1/155* (2013.01); *H04N 13/305* (2018.05); *H04N 13/31* (2018.05); *G02F 1/163* (2013.01); *G02F 1/29* (2013.01)

(56) References Cited

U.S. PATENT DOCUMENTS

| | | | |
|---|---|---|---|
| 2009/0201362 A1 | 8/2009 | Shestak et al. | |
| 2009/0224646 A1* | 9/2009 | Kim | G02B 27/2214 |
| | | | 313/245 |
| 2013/0076724 A1 | 3/2013 | Park et al. | |
| 2014/0063383 A1* | 3/2014 | Xie | G02B 27/2228 |
| | | | 349/15 |
| 2014/0118824 A1 | 5/2014 | Hsieh et al. | |

FOREIGN PATENT DOCUMENTS

| | | |
|---|---|---|
| CN | 102710956 A | 10/2012 |
| CN | 102998805 A | 3/2013 |
| CN | 103024407 A | 4/2013 |
| CN | 103048835 A | 4/2013 |
| CN | 202948226 U | 5/2013 |
| CN | 202948233 U | 5/2013 |
| CN | 103207456 A | 7/2013 |
| CN | 103207457 A | 7/2013 |
| CN | 103595993 U | 2/2014 |
| CN | 203433240 U | 2/2014 |
| CN | 103941492 A | 7/2014 |
| CN | 104155824 A | 11/2014 |
| CN | 101726846 A | 6/2016 |

OTHER PUBLICATIONS

The Second Chinese Office Action dated Sep. 1, 2017; Appln. No. 201410390048.8.

* cited by examiner

US 10,200,682 B2

ACTIVE GRATING, THREE-DIMENSIONAL DISPLAY DEVICE AND THREE-DIMENSIONAL DISPLAY METHOD

TECHNICAL FIELD

Embodiments of the invention relate to an active grating, a three-dimensional display device and a three-dimensional display method.

BACKGROUND

Currently, common naked-eye three-dimensional (3D) display devices are mainly divided into a parallax barrier type and a lenticular lens type. The basic principle thereof is to divide an image into a left-eye image and a right-eye image, and after the left-eye image and the right-eye image are transmitted through a parallax barrier or a lenticular lens, a plurality of left viewing regions and right viewing regions arranged alternately are presented in front of a display panel. When a left eye of a viewer is in the left viewing region and a right eye of the viewer is in the right viewing region, the left eye of the viewer can see the corresponding left-eye image, and the right eye can see the corresponding right-eye image. The left-eye image and the right-eye image are a pair of stereoscopic images, thus, the brain may combine them into a 3D image, so as to produce 3D display effect.

However, when the viewer views the 3D image displayed by the above-described 3D display device, he or she has to be positioned at a certain position in front of the naked-eye 3D display device in order to see the 3D image with better effect. Otherwise, the stereoscopic effect is poor, even no stereoscopic effect is obtained at all.

SUMMARY OF THE INVENTION

Embodiments of the invention provide an active grating, a three-dimensional display device and a three-dimensional display method capable of increasing practicability of the 3D display device.

An embodiment of the invention provides an active grating, comprising: a first substrate and a second substrate, disposed oppositely; a plurality of first strip electrodes, disposed to be spaced from each other with an equal interval on a side of the first substrate facing the second substrate; a common electrode, disposed on a side of the second substrate facing the first substrate; a light control layer, disposed between the plurality of first strip electrodes and the common electrode; and a driving circuit, electrically connected to the common electrode and each of the first strip electrodes respectively, wherein the driving circuit enables a part of the first strip electrodes to be energized and another part of the first strip electrodes not to be energized, so as to form a plurality of light transmitting region and a plurality of light shielding regions arranged alternately.

An embodiment of the invention further provides a three-dimensional display device, comprising: a display panel and an active grating according to any one of claims 1 to 4, disposed oppositely; a face recognition module, configured to acquire a distance from a current viewer to the active grating; a first calculating module, in signal connection with the face recognition module, configured to calculate a theoretical horizontal width of each of the light shielding regions when the current viewer see an ideal 3D image at a current position, according to the distance acquired by the face recognition module and a first corresponding relationship between the distance from the current viewer to the active grating and the theoretical horizontal width of each of the light shielding regions of the active grating when the current viewer see the ideal 3D image; and an adjusting module, in signal connection with the first calculating module and the driving circuit of the active grating respectively, configured to send a corresponding first control instruction to the driving circuit according to the theoretical horizontal width calculated by the first calculating module so as to adjust an actual horizontal width of each of the light shielding regions of the active grating, so that the actual horizontal width equals to the theoretical horizontal width, wherein the actual horizontal widths of the light shielding regions are equal, and the theoretical horizontal widths of the light shielding regions are equal.

An embodiment of the invention provides a three-dimensional display method for the above-described three-dimensional display device, comprising: acquiring the distance from the current viewer to the active grating; calculating a theoretical horizontal width of each of the light shielding regions when the viewer see an ideal 3D image at a current position, according to the distance from the current viewer to the active grating and the first corresponding relationship between the distance from the viewer to the active grating and the theoretical horizontal width of each of the light shielding regions of the active grating when the viewer see the ideal 3D image, wherein the theoretical horizontal widths of the light shielding regions are the same; sending the corresponding first control instruction to the driving circuit of the active grating, according to the calculated theoretical horizontal width of each of the light shielding regions, and adjusting an actual horizontal width of each of the light shielding regions of the active grating, so that the actual horizontal width equals to the theoretical horizontal width, wherein the actual horizontal widths of the light shielding regions are the same.

BRIEF DESCRIPTION OF THE DRAWINGS

In order to clearly illustrate the technical solution of the embodiments of the invention, the drawings of the embodiments will be briefly described in the following; it is obvious that the drawings in the description are only related to some embodiments of the invention and thus are not limitative of the invention.

DESCRIPTION OF THE EMBODIMENTS

In order to make objects, technical details and advantages of the embodiments of the invention apparent, hereinafter, the technical solutions of the embodiments of the invention will be described in a clearly and fully understandable way in connection with the drawings related to the embodiments of the invention. It is obvious that the described embodiments are just a part but not all of the embodiments of the invention. Based on the described embodiments of the invention, those ordinarily skilled in the art can obtain other embodiment(s), without any inventive work, which should be within the scope sought for protection by the invention.

The technical solution in embodiments of the invention will be described in detail in conjunction with accompanying drawings of the specification.

A First Embodiment

Figure 1:
FIG. 1 is a connection diagram of various components of a three-dimensional display device provided by embodiments of the invention.
Figure 2:
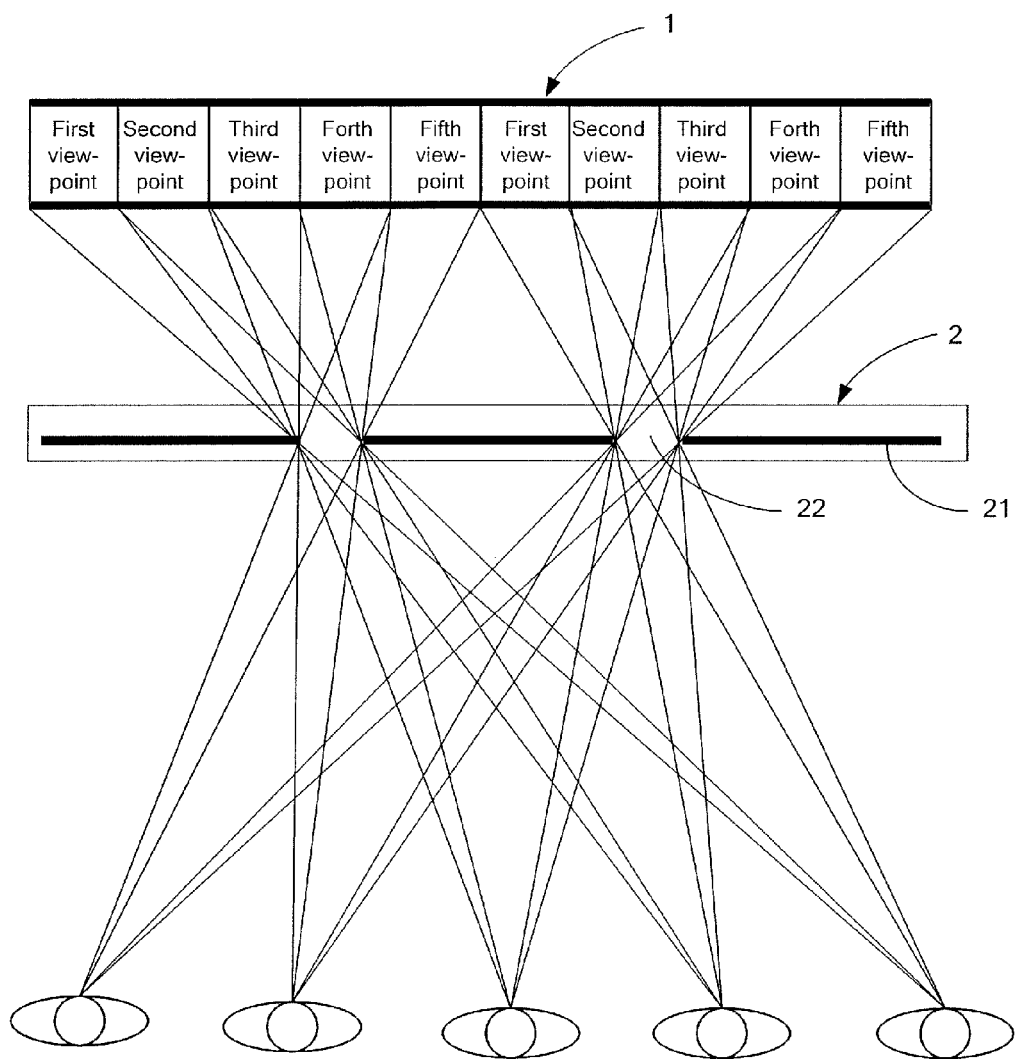
FIG. 2 is a display schematic diagram of a three-dimensional display device provided by embodiments of the invention.

Referring to FIG. 1 and FIG. 2, a three-dimensional display device according to the first embodiment of the present invention includes: a display panel 1 and an active grating 2 oppositely disposed; a face recognition module, configured to acquire a distance between the active grating 2 and a viewer positioned at a light exiting side (an image display side) of the display panel 1; a first calculating module, in signal connection with the face recognition module; and an adjusting module, in signal connection with the first calculating module and a driving circuit of the active grating 2 respectively, wherein the face recognition module may be a face recognition camera or a infrared camera. For example, the face recognition module may be the face recognition camera, which is installed at an edge of the display panel 1 and/or an edge of the active grating 2, or is installed on a housing of the three-dimensional display device, for acquiring the distance from the viewer to the active grating 2.

The first calculating module calculates and obtains a theoretical horizontal width of each of the light shielding regions 21 when the viewer see an ideal 3D image at a current position, according to the distance between the viewer and the active grating 2 acquired by the face recognition module and a first corresponding relationship between the distance from the viewer to the active grating 2 and the theoretical horizontal width of each of the light shielding regions 21 of the active grating 2 when the viewer can see the ideal 3D image, wherein the theoretical horizontal widths of the light shielding regions 21 are equal.

According to the theoretical horizontal width of each of the light shielding regions 21 calculated by the first calculating module, the adjusting module sends a corresponding first control instruction to the driving circuit of the active grating 2, so as to adjust an actual horizontal width of the light shielding region 21 of the active grating 2, so that the actual horizontal width equals to the theoretical horizontal width, wherein the actual horizontal widths of the light shielding regions 21 are equal to each other. It should be noted that the first control instruction is generated by the adjusting module according to the theoretical horizontal width of the light shielding region 21 calculated by the first calculating module. Therefore, different theoretical horizontal widths correspond to different first control instructions. These first control instructions are all provided to the driving circuit of the active grating 2, so that the driving circuit powers on or off a part of first strip electrodes of the active grating 2 according to these first control instructions, in order to generate the light shielding region 2 with the horizontal width required.

For example, in the above-described three-dimensional display device, the active grating 2 and the display panel 1 are oppositely disposed. Optionally, the active grating 2 is located at a light exiting side of the display panel 1; or, the active grating 2 is located at a light incident side of the display panel 1, that is, the active grating 2 is located between the display panel 1 and a backlight assembly of the three-dimensional display device. Since the working principle of the active grating 2 being at the light incident side of the display panel 1 is essentially the same as that of the active grating 2 being at the light exiting side of the display panel 1, the active grating 2 being at the light exiting side of the display panel 1 will be taken as an example to describe the working principle of the above-described three-dimensional display device for convenience.

Returning to FIG. 2, the active grating 2 is located at the light exiting side of the display panel 1. The active grating 2 includes a plurality of light shielding regions 21 and a plurality of light transmitting regions 22 arranged alternately, and horizontal widths of the light shielding regions 21 are equal and intervals therebetween are equal, and horizontal widths of the light transmitting regions 22 are equal and intervals therebetween are equal. Assuming that the display panel 1 of the three-dimensional display device has five viewpoints, and the five viewpoints are arranged periodically. Light emitted from the display panel 1 passes through the active grating 2, and then generates a plurality of viewing regions corresponding to the five viewpoints, which are a plurality of viewing regions corresponding to a first viewpoint, a plurality of viewing regions corresponding to a second viewpoint, a plurality of viewing regions corresponding to a third viewpoint, a plurality of viewing regions corresponding to a forth viewpoint and a plurality of viewing regions corresponding to a fifth viewpoint, and for convenient description, the plurality of viewing regions corresponding to the first viewpoint are collectively referred as a first viewing region, the plurality of viewing regions corresponding to the second viewpoint are collectively referred as a second viewing region, the plurality of viewing regions corresponding to the third viewpoint are collectively referred as a third viewing region, the plurality of viewing regions corresponding to the forth viewpoint are collectively referred as a forth viewing region and the plurality of viewing regions corresponding to the fifth viewpoint are collectively referred as a fifth viewing region, and distances from the first to five viewing regions to the active grating are equal to each other. When a viewer views an image in the above viewing regions, watched 3D images are images acquired by photographing one scene from different angles between which there is a certain parallax. Images displayed in the first viewing region to the fifth viewing region only have small differences due to different photographing angles, and when the viewer is located in one of the viewing regions, a left eye of the viewer is located in a left viewing region and a right eye is located in a right viewing region, so that an ideal 3D image may be seen by the viewer.

According to the above description, when the viewer watches an image in the five viewing regions in front of the active grating 2, the viewer may see an ideal 3D image. When the viewer watches an images outside the five viewing regions, for example, the viewer moves forward or backward with respect to the display panel 1, that is, when a distance between the viewer and the active grating 2 changes, the three-dimensional display device provided by the embodiment will adjust the horizontal widths of light shielding regions 2 of the active grating 2 automatically according to the distance from the current viewer to the active grating 2, so that positions of viewing regions formed after the viewpoints are transmitting through the active grating 2 move forward or backward with respect to the active grating 2, in order to coincide with a position of the current viewer, thereby the viewer can see an ideal 3D image.

For example, when the distance from the viewer to the active grating 2 changes, a face recognition module acquires the distance from the viewer to the active grating 2; a first calculating module calculates a theoretical horizontal width of each of the light shielding regions 21 when the viewer can see an ideal 3D image at a current position, according to the distance from the viewer to the active grating 2 and a first corresponding relationship between the distance from a current viewer to the active grating 2 and the theoretical horizontal width of each of the light shielding regions of the active grating when the viewer can see the ideal 3D image; an adjusting module sends a corresponding first control instruction to a driving circuit of the active grating 2 according to the theoretical horizontal width calculated by the first calculating module so as to adjust an actual horizontal width of each of the light shielding regions of the active grating 2, so that the actual horizontal width equals to the theoretical horizontal width. When the actual horizontal width of the light shielding region 21 equals to the theoretical horizontal width, light emitted from the display panel 1 generates new viewing regions after passing through the active grating 2, and the newly generated viewing regions coincide with a position of the viewer, so that the viewer may be ensured to see the ideal 3D image.

Figure 3:
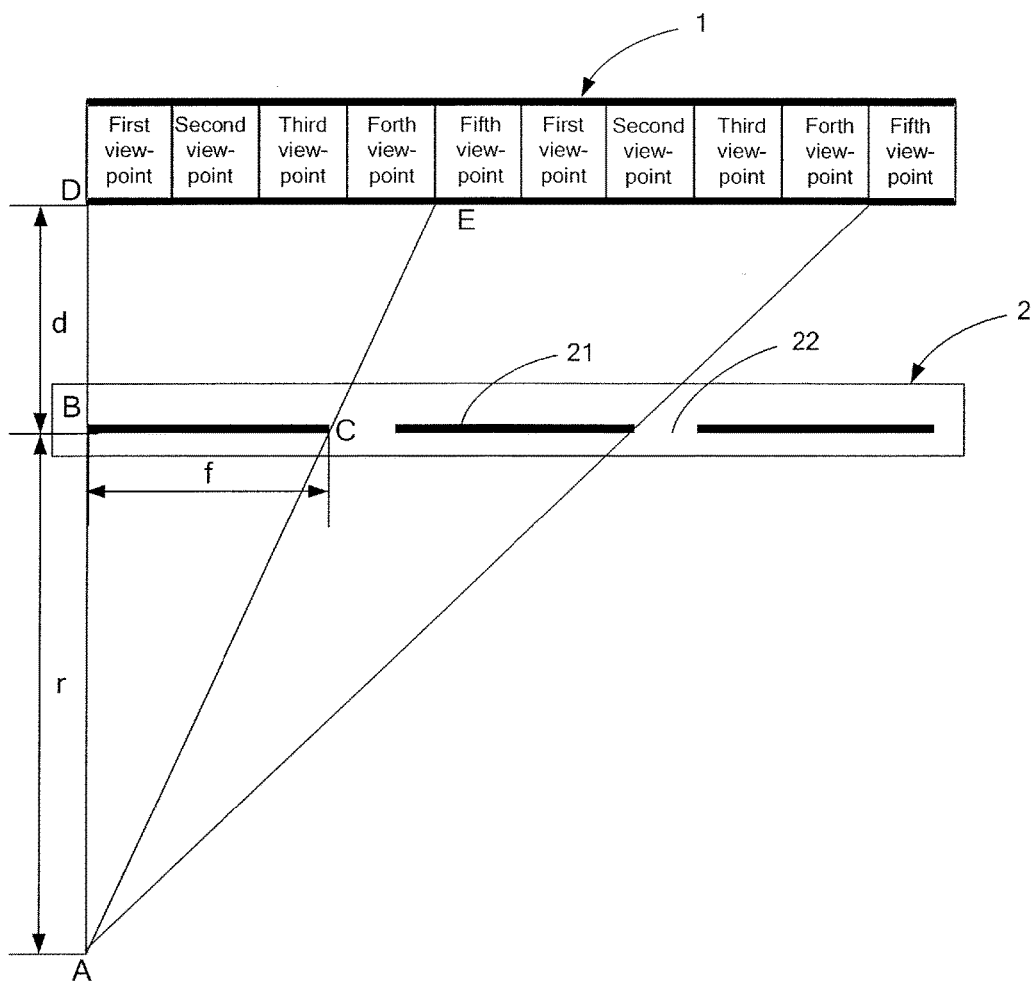
FIG. 3 is a schematic diagram when a viewer can see an image displayed by a three-dimensional display device.

For example, referring to FIG. 3, when the viewer is in a viewing region of point A, a distance r from the viewer to the active grating equals to a length of AB. In order to allow the viewer to see the ideal 3D image in the viewing region of point A, a triangle ABC and a triangle ADE may be constructed as shown in FIG. 3 according to travelling path of light, and the triangle ABC and the triangle ADE are similar triangles. As shown in FIG. 3, in order to avoid crosstalk, one eye only sees one viewpoint and other viewpoints are blocked by the grating, so that the best viewing effect can be obtained. According to similar triangle law, the following equation is obtained:

$$\frac{BC}{DE} = \frac{AB}{AB+BD}$$

wherein, an edge BC is the theoretical horizontal width of each of the light shielding regions of the active grating, and the theoretical horizontal width is represented by f. An edge DE is a corresponding viewpoint width on a display panel, the width is represented by (n−1)*p, and n is the number of the viewpoints on the display panel 1 and is constant, and in this embodiment, n is equal to 5, and p is a width of a sub-pixel in the display panel 1 and is a constant number. An edge AB is the distance from the viewer to the active grating, represented by r. An edge BD is a distance from the active grating to the display panel, represented by d. When the above values are put into the above equation, the following equation is obtained:

$$\frac{f}{(n-1)*p} = \frac{r}{r+d}$$

the above equation is transformed into an equation 1:

$$f = \frac{r \times (n-1) \times p}{r+d}$$

wherein, f is the theoretical horizontal width of each light shielding region for the active grating; r is the distance from the viewer to the active grating; n is a constant number, representing the number of viewpoints in the display panel; p is a constant number, representing a width of the sub-pixel in the display panel, and d is the distance between the active grating and the display panel.

According to the distance from the viewer to the active grating 2 obtained by the face recognition module and the equation 1, the first calculating module obtains the theoretical horizontal width f of the light shielding region 21 when the viewer can see an ideal 3D image under a condition that the distance from the viewer to the active grating changes by calculating. The adjusting module generates the first control instruction corresponding to the theoretical horizontal width, according to the theoretical horizontal width calculated by the first calculating module, and sends the first control instruction to a driving circuit of the active grating 2, then, the actual horizontal width of each of the light shielding regions 21 of the active grating 2 are adjusted, so that the actual horizontal width equals to the theoretical horizontal width. Therefore, light emitted from the display panel 1 generates new viewing regions after passing through the active grating 2, and the newly generated viewing regions coincide with a position of the viewer, thus, the viewer can see the ideal 3D image.

It should be noted that, when adjusting the horizontal width of the light shielding region 21, a central position of each of the light shielding regions 21 remains unchanged. Thus, adjusting the horizontal width of the light shielding region 21 is to change a distance from each of two ends of the light shielding region 21 to the central position.

From the above solution, when a viewer is located within a variable range of the viewing region of the three-dimensional display device provided by the embodiments of the invention, the three-dimensional display device may adjust the horizontal width of each of the light shielding regions 2 of the active grating 2 automatically according to the distance from the viewer to the active grating 2, so that a position of a viewing region formed after viewpoints of the display panel 1 are transmitted through the active grating 2 coincide with a position of the viewer, which ensures that the viewer can see the ideal 3D image. Thus, compared with a conventional three-dimensional display device which requires the viewer to see an ideal 3D image only at a fixed viewing region position, the three-dimensional display device provided by the embodiments of the invention changes a position of an viewing region according to a position coordinates of the viewer, so that the ideal 3D images can be seen by the viewer not positioned at the fixed viewing region position, thus, improving practicality of the three-dimensional display device obviously.

In the above embodiments, if only one viewer views the three-dimensional display device provided by the embodiments, the viewer must be located within a variable range of the viewing region of the three-dimensional display device, and the three-dimensional display device adjusts the horizontal width of each of the light shielding region 21 of the active grating according to a distance from the viewer to the active grating, so that a newly generated viewing region coincide with a position of the viewer, which ensures that the viewer can see an ideal 3D image. If a plurality of viewers view the above three-dimensional display device, all of the viewers must be located within the variable range of viewing region the three-dimensional display device and are located in a same row in front of the display panel 1 (distances from the viewers to the active grating are the same), and at the same time, a certain interval between any two adjacent viewers needs to be maintained, thus, it can ensures that all of the viewers can see ideal 3D images. In reality, however, it is easy to ensure that the distances from the viewers to the active grating 2 are the same (for example, the viewers sit on a long couch in front of the three-dimensional display device), and it is difficult to ensure a horizontal interval between the viewers, thus, some of the viewer may not see ideal 3D images.

Figure 4:
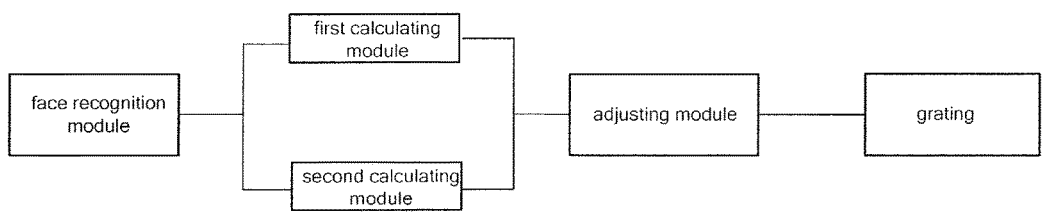
FIG. 4 is another connection diagram of various components of a three-dimensional display device provided by embodiments of the invention.

Referring to FIG. 4, in order to resolve the above problem, the above-described three-dimensional display device may further include a second calculating module in signal connection with the face recognition module and the adjusting module. The face recognition module may be further configured to acquire a horizontal interval between any two adjacent viewers in the same row in front of an active grating 2; according to the horizontal interval between any two adjacent viewers and a second corresponding relationship between a maximum horizontal interval between adjacent viewers and a offset amount of a crosstalk region of the active grating 2, a second calculating module calculates to obtain a offset amount of each of the crosstalk regions of the active grating 2 when each of the viewers can see an ideal 3D image; an adjusting module sends a corresponding second control instruction to the driving circuit of the active grating 2 according to the offset amount calculated by the second calculating module so as to adjust a relative position of each of the light shielding regions 21 in the active grating 2, so that the crosstalk region of the active grating 2 corresponds to a middle position between any two adjacent viewers.

For example, the face recognition module acquires a distance from viewers in front of an active grating 2 to the active grating 2 and acquires the horizontal interval between any two adjacent viewers. The horizontal interval between any two adjacent viewers may be acquired by followings: referring to FIG. 2, by taking that a display panel 1 has five viewpoints, three viewers view naked-eye 3D images in front of the active grating 2 and distances from the three viewers to the active grating 2 are the same (the three viewers are in the same row in front of the active grating 2) as a example, a viewpoint corresponding to a first viewer acquired by the face recognition module is viewpoint 1, a viewpoint corresponding to a second viewer is viewpoint 3, and a viewpoint corresponding to a third viewer is viewpoint 4. According to the viewpoints respectively corresponding to the three viewers, a viewpoint interval between the first viewer and the second viewer is 2, a viewpoint interval between the second viewer and the third viewer is 1, a viewpoint interval between the first viewer and the third viewer is 2, thus, it is further determined that a horizontal interval D1 between the first viewer and the second viewer is 2 tp, a horizontal interval D2 between the second viewer and the third viewer is 1 tp, a horizontal interval D3 between the first viewer and the third viewer is 2 tp, wherein p is a width of a sub-pixel in the display panel 1, t is the number of the sub-pixels included within a unit viewpoint interval and is a constant number. From above, the horizontal interval D1 between the first viewer and the second viewer and the horizontal interval D3 between the first viewer and the third viewer are largest, which are 2 tp, respectively.

In order to allow viewers to see ideal 3D images, each of the crosstalk regions of the active grating 2 needs to correspond to a middle position between two adjacent viewers. A viewpoint interval corresponding to each of the crosstalk regions meets the following equation: stp=ntp−[Ntp+½max (D1, D2, D3)], which is transformed into equation 2:

$$s = n - [N + 1/2D]$$

wherein, s is a offset amount of each of the crosstalk regions of the active grating; n is the number of viewpoints of the display panel 1 and is a constant value; N is a viewpoint corresponding to one of two adjacent viewers with maximum horizontal interval; and D is a horizontal interval between two viewpoints respectively corresponding to the two adjacent viewers with the maximum horizontal interval. It should be noted that, units for variables and constant numbers in the equation 2 are represented by the numbers of viewpoints.

The second calculating module calculates the offset amount of each of the crosstalk regions when the viewers can see ideal 3D images according to the horizontal interval between adjacent viewers and the above equation 2. The adjusting module generates a second control instruction according to the offset amount, and sends the second control instruction to a driving circuit of the active grating 2 so as to adjust a relative position of each of the light shielding regions 2 in the active grating 2, so that each of the crosstalk regions of the active grating 2 corresponds to a middle position between the two adjacent viewers and it is ensured that all of the viewers can see the ideal 3D images. It should be noted that, in order to simplify a structure of the three-dimensional display device, for example, the first calculating module, the adjusting module and the second calculating module are integrated in the same information processing unit.

In above embodiments, under a condition that a plurality of viewers view the above-described three-dimensional display device, in order to ensure all of the viewers to see ideal 3D images, all of the viewers have to be located in the same row in front of the active grating 2 and the viewers have to be located within a variable range of a viewing region of the three-dimensional display device. If one or more viewers are not in the same row with the majority of the viewers or beyond the variable range of the viewing region, the above-described three-dimensional display device automatically adjusts the active grating for the majority of the viewers in the same row, that is, after the active grating 2 (the horizontal width of the light shielding region) is adjusted, the viewers meeting the above condition can see ideal 3D images, while viewers who does not meet the above condition could not see ideal 3D images.

However, the viewer which does not meet the above condition may not know that seeing the ideal 3D image needs to meet the above condition. In this regard, the above three-dimensional display device may further include a notification module and a display module in signal connection with the notification module. The notification module is used to send notification information to a viewer who fails to see an ideal 3D image so as to inform the viewer of moving to a certain position in order to see the ideal 3D image and the display module displays the notification information to the viewer. For example, after the adjusting module adjusts the horizontal width of each of the light shielding region of the active grating 2 and the relative position of each of the light shielding region in the active grating 2, if the face recognition module detects left and right eyes of the first viewer, the second viewer and the third viewer are respectively located within viewing regions where an ideal 3D image can be seen, while left and right eyes of the forth viewer is not located within the viewing regions where an ideal 3D image can be seen, the notification module sends the notification module to the forth viewer and informs the forth viewer of moving to a certain position in order to see the ideal 3D image, thus, the viewing experience of the viewer can be improved. The display module displays coordinates of a position where the viewer can see an ideal 3D image.

A Second Embodiment

Figure 5:
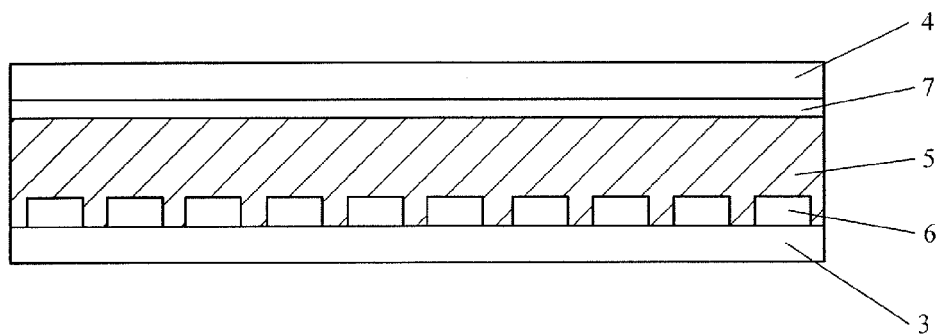
FIG. 5 is a structural diagram of an active grating provided by embodiments of the invention.

Referring to FIG. 5, an embodiment of the invention further provides an active grating, comprising: a first substrate 3 and a second substrate 4 oppositely disposed; a plurality of first strip electrodes 6, disposed to space from each other at an equal interval on the first substrate 3; a common electrode 7, disposed on the second substrate 4; a light control layer 5, disposed between the plurality of first strip electrodes 6 and the common electrode 7; and a driving circuit, electrically connected to the common electrode 7 and each of the first strip electrodes 6 respectively, wherein a part of the first strip electrodes 6 are energized and the other part of the first strip electrodes 6 are not energized by the driving circuit, so as to generate a plurality of light transmitting regions 22 and a plurality of light shielding regions 21 arranged alternately.

Figure 8:
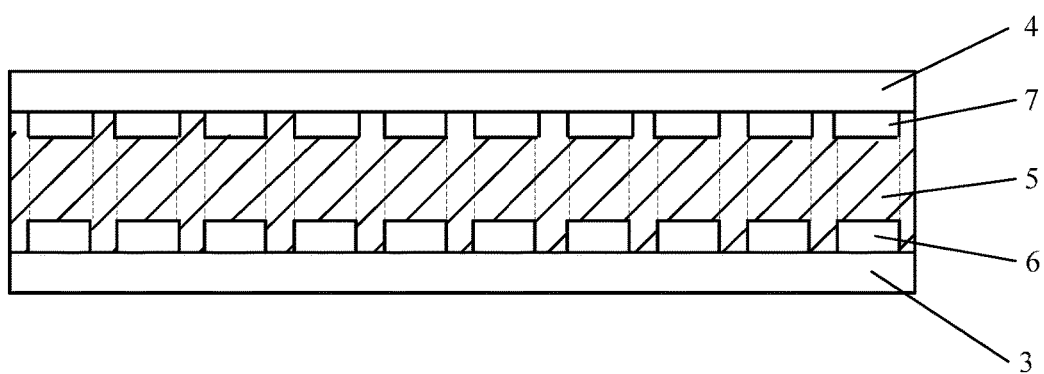
FIG. 8 is another structural diagram of an active grating provided by embodiments of the invention.

For example, the common electrode 7 on the second substrate 4 is a plate-shaped electrode, as shown in FIG. 5, or a plurality of second strip electrodes disposed opposite to the plurality of the first strip electrodes on the first substrate 3 in a one-to-one corresponding relationship, as shown in FIG. 8. The light control layer 5 may be a liquid crystal layer or an electrochromism layer. When the light control layer 5 is the liquid crystal layer, the active grating is also called as a liquid crystal grating, and polarizers are respectively disposed on surfaces of the first substrate 3 and the second substrate 4 of the liquid crystal grating facing away from the liquid crystal layer; or one polarizer is shared by a substrate of the liquid crystal grating and the display panel, while another polarizer is disposed on a surface of the other substrate facing away from the liquid crystal layer.

In this embodiment, the light control layer 5 is the liquid crystal layer, the common electrode 7 is the plate-shaped electrode. When the driving circuit powers on a part of the first strip electrodes 6 and powers off another part of the first strip electrodes 6, liquid crystal molecules in the liquid crystal layer corresponding to the energized first strip electrodes are deflected, thus, light is blocked and light shielding regions are formed; liquid crystal molecules in the liquid crystal layer corresponding to the first strip electrodes which are not energized are not deflected, thus, light is transmitted through and light transmitting regions are formed. The light shielding regions and the light transmitting regions form the grating as required.

Apparently, a width of any one of the first strip electrodes 6 is a minimum variable width of each of the light shielding regions 21 of the active grating 2, thus, it is necessary to reduce the width of the first strip electrode 6 as soon as possible, in order to further improve display effect of the three-dimensional display device. For example, the width of the first strip electrode 6 equals to a width of a sub-pixel of the display panel 1.

Figure 6:
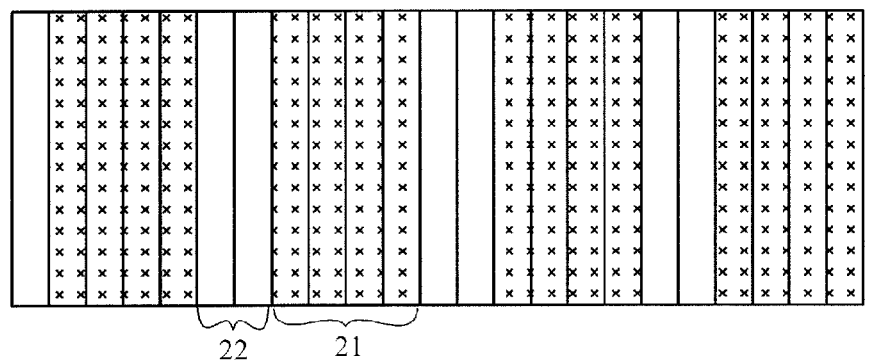
FIG. 6 is an arrangement of light shielding regions of an active grating in FIG. 5.
Figure 7:
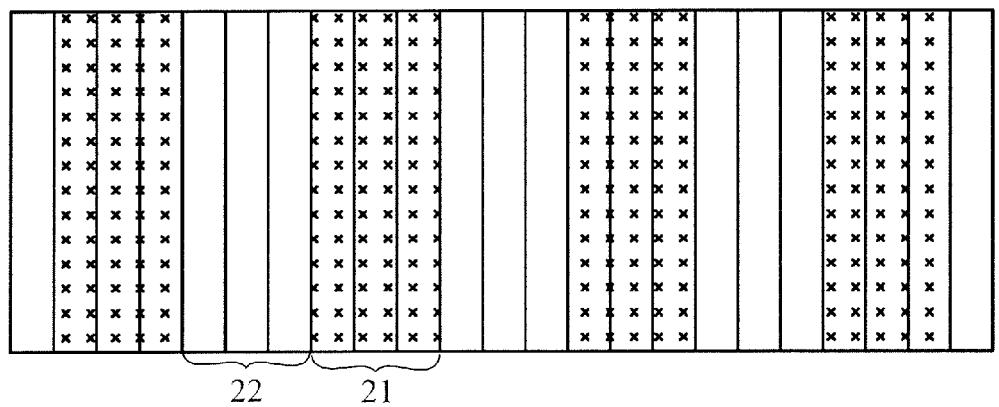
FIG. 7 is another arrangement of light shielding regions of an active grating in FIG. 5.

For example, when the three-dimensional display device employs the active grating provided by the embodiment, the adjusting module adjusts the active grating 2 according to a theoretical horizontal width of each of the light shielding regions 21 calculated by the first calculating module and a offset amount of each of the crosstalk regions calculated by the second calculating module, in the following way:

When the driving circuit of the active grating 2 is not received the first control instruction, the driving circuit maintains current state controlling each of the first strip electrodes 6 being energized or being not energized, so that the horizontal width of each of the light transmitting regions 22 and the light shielding regions 21 keep unchanged. As shown in FIG. 6, each strip represents one region corresponding to one first strip electrode 6, each of the light shielding regions 21 occupies a region corresponding to four first strip electrodes 6, and each of the light transmitting regions 22 occupies a region corresponding to two of the first strip electrodes 6. When the distance from the viewer to the active grating changes, the first calculating module calculates the theoretical horizontal width of the light shielding region for the viewer to see an ideal 3D image, the adjusting module sends the first control instruction to the driving circuit of the active grating according to the theoretical horizontal width, so that the number of the first strip electrodes 6 energized and the number of the first strip electrodes 6 being not energized are changed, deflection of liquid crystal molecules of the liquid crystal layer between the first substrate 3 and the second substrate 4 is changed, in turn, the horizontal width of the light shielding region 21 is changed. It should be noted that, when the horizontal width of the light shielding region 21 is changed, a distance between centers of two adjacent light shielding regions 21 is not changed and the light transmitting region 22 (slit) between two adjacent light shielding regions 21 is changed. The light shielding regions 21 after the horizontal width is changed are shown in FIG. 7, and at this time, each of the light shielding regions 21 occupies an region corresponding to three of the first strip electrodes 6, and each of the light transmitting regions 22 occupies an region corresponding to three of the first strip electrodes 6. by changing the horizontal width of each of the light shielding regions 21 (from four of the first strip electrodes 6 occupied in FIG. 6 to three of the first strip electrodes 6 occupied in FIG. 7), it is ensured for the viewer to see an ideal 3D image.

The processing of changing a relative position of each of the light shielding regions 21 in the active grating according to a offset amount of each crosstalk region by the adjusting module is essentially the same as the above-described processing, therefore the description of which is omitted. It should be noted that, after the relative position of the light shielding region 21 in the active grating 2 is changed, the horizontal width of each of the light shielding regions 21 remains unchanged. Only under a condition that the distance from the viewer to the active grating 2 is changed, the horizontal width of each of the light shielding regions 21 is changed correspondingly.

It should be noted that, the above-described active grating is classified as a normal-black mode and a normal-white mode according to a display mode, wherein the active grating of the normal-black mode is transparent while being energized, and is opaque while being not energized, and the active grating of the normal-white mode is opaque while being energized, and is transparent while being not energized. Currently, the naked-eye 3D display technology is not widely spread, 3D video sources are rare and most of the video sources are 2D video sources, therefore the active grating provided by the above-described embodiments may be an active grating in the normal-white mode, and when all of the first strip electrodes 6 are not energized, the active grating is transparent, so that the three-dimensional display device becomes a normal 2D display device, which can meet the wide requirement of the viewer.

A Third Embodiment

An embodiment of the invention further provides a three-dimensional display method for the above-described three-dimensional display device, comprising:

Step 101, acquiring a distance from a current viewer to an active grating.

For example, position coordinates of the viewer in front of the active grating may be acquired by a face recognition module. For instance, a certain sub-pixel in a display panel 1 may be as a coordinate origin, thus, the distance from the viewer to the active grating and coordinates of a viewpoint corresponding to the current viewer may be acquired according to the position coordinates of the viewer.

Step 102, performing calculating to obtain a theoretical horizontal width of each of the light shielding regions of the active grating when the viewer can see an ideal 3D image at a current position, according to the acquired distance from the current viewer to the active grating and a first corresponding relationship between the distance from the viewer to the active grating and the theoretical horizontal width of each of the light shielding regions of the active grating when the viewer can see an ideal 3D image, wherein the theoretical horizontal widths of the light shielding regions are the same. Specific calculating process is implemented by the first calculating module.

Step 103, sending a corresponding first control instruction to a driving circuit according to the calculated theoretical horizontal width of each of the light shielding regions, and adjusting an actual horizontal width of each of the light shielding regions of the active grating 2, so that the actual horizontal width equals to the theoretical horizontal width, wherein the actual horizontal widths of the light shielding regions 21 are the same. Specific process for adjusting the horizontal width of each of the light shielding regions of the active grating 2 may be controlled by the adjusting module.

For example, in the above step 102, the first corresponding relationship may be:

$$f = \frac{r \times (n-1) \times p}{r + d}$$

wherein, f is the theoretical horizontal width of each of the light shielding regions for the active grating (the unit is the number of sub-pixels), r is the distance from the viewer to the active grating, n is a constant number and represents the number of viewpoints in the display panel 1, p is a constant number and represents a width of the sub-pixel in the display panel 1 and d is the distance between the active grating 2 and the display panel. Specific derivation has been described in details above, therefore the description of which is omitted. The first calculating module calculates the theoretical horizontal width of each of the light shielding regions when a viewer can see an ideal 3D image at a current position according to the distance from the current viewer to the active grating by means of the above equation.

The adjusting module generates a corresponding first control instruction and sent it the driving circuit of the active grating according to the theoretical horizontal width of each of the light shielding regions 21 when the current viewer can see an ideal 3D image; the driving circuit enables a part of first strip electrodes of the active grating to be energized and enables another part of the first strip electrodes of the active grating not to be energized according to the first control instruction, so that a plurality of light shielding regions 21 and a plurality of light transmitting regions 22 arranged alternately are formed. And the actual horizontal width of the generated light shielding region equals to the theoretical horizontal width, which may further ensures that the viewer at the current position can see the ideal 3D image.

In a case that a viewer views the three-dimensional display device employing the above-described three-dimensional display method to display, if there is one viewer, the three-dimensional display device may automatically adjust the horizontal width of each of light shielding regions of the active grating according to the distance from the viewer to the active grating, so that it is ensured that at any position the viewer can see an ideal 3D image. If there is a plurality of viewers viewing the three-dimensional display device at the same time, in order to make each of the viewers see ideal 3D image, the plurality of viewers should be located in the same row in front of the three-dimensional display device, that is, the distances from the plurality of viewers to the active grating need to be the same, and meanwhile, a certain interval between adjacent viewers should be ensured. If the horizontal interval between two adjacent viewers changes, a left eye or a right eye of the viewer may correspond to the crosstalk region of the active grating according to a displaying principle f the three-dimensional display device, thus, the viewer cannot see the ideal 3D image.

In this regard, in order to ensure that the viewer can still see an 3D image displayed by the three-dimensional display after the horizontal interval between adjacent viewers is changed, the above-described display method further includes:

acquiring a current horizontal interval between adjacent viewers in a same row in front of the display panel;

calculating a offset amount of each of the crosstalk regions of the active grating when the current viewers can see the ideal 3D images, according to the acquired current horizontal interval between the adjacent viewers and a second corresponding relationship between a maximum horizontal interval between the adjacent viewers and the offset amount of each of the crosstalk regions of the active grating when the viewers can see ideal 3D images;

sending a corresponding second control instruction to a driving circuit according to the calculated offset amount each of the crosstalk regions, adjusting a relative position of each of the light shielding regions on the active grating, so that the crosstalk regions of the active grating correspond to a middle position between two adjacent viewers.

For example, the above-described second corresponding relationship may be presented as:

$$s = n - [N + 1/2D]$$

wherein, s is the offset amount of each of the light shielding regions of the active grating, n is a constant number and is the number of viewpoints for the display panel, N is the viewpoint corresponding to one of the two adjacent viewers with the maximum horizontal interval, D is a horizontal interval between two viewpoints corresponding to the two adjacent viewers with the maximum horizontal interval.

The second calculating module determines a maximum horizontal interval between the adjacent viewers according to the horizontal interval between adjacent viewers, and then calculates the offset amount of each of the crosstalk regions when viewers can see an ideal 3D image according to the above-described equation. The adjusting module generates a second control instruction according to the offset amount of each of the crosstalk regions of the active grating calculated by the second calculating module, and sends the corresponding second control instruction to a driving circuit of the active grating; the driving circuit enables a part of first strip electrodes of the active grating to be energized and enables another part of the first strip electrodes of the active grating not to be energized, so that a plurality of light shielding regions and a plurality of light transmitting regions arranged alternately are formed, wherein the light shielding regions formed after the second control instruction is received are moved left or moved right entirely compared with the light shielding regions formed before the second control instruction is received. Positions of the crosstalk regions of the active grating is adjusted, so that positions of the crosstalk regions are adjusted, and each of the crosstalk regions is made to correspond to a middle position between the two adjacent viewers, which can further ensure that the viewers at current positions can see the ideal 3D images.

From the description of the above embodiments, those skilled in the related art may understand that the embodiments of the invention may be implemented using software and necessary general hardware, and may be implemented using hardware. Based on this, the technical solution of the embodiments of the invention may be embodied in a software product essentially. The software product is stored within a readable storage medium, such as floppy disk, hard disk, optical disk or the like for a computer.

With the active grating, the three-dimensional display device and the three-dimensional display method according to the embodiments of the invention, when a viewer is located within a variable range of a viewing region of the three-dimensional display device provided by the embodiments of the invention, a horizontal width of each of light shielding regions of an active grating may be automatically adjusted according to position coordinates of the viewer (a distance from the viewer to the active grating), so that a position of a viewing region formed by viewpoints of a display panel passing through the active grating coincides with a position of the viewer, and the viewer can see an ideal 3D image. Thus, compared with a conventional three-dimensional display device which requires the viewer to see an ideal 3D images only at a fixed viewing region position, the three-dimensional display device provided by the embodiments of the invention may changes the viewing region position according to the position coordinates of the viewer, so that the ideal 3D images can be seen by the viewer not positioned at the fixed viewing region position, thus, improving practicality of the three-dimensional display device obviously.

Apparently, various modifications and variants can be made to embodiments of the invention by those skilled in the art without departing from the spirit and scope of the invention. As such, provided that these modifications and variants of the invention fall within the scope of claims of the invention and equivalent technologies thereof, it is also intended for the invention to embrace them therein.

The application claims priority of Chinese Patent Application No. 201410390048.8 filed on Aug. 8, 2014, the disclosure of which is incorporated herein by reference in its entirety as part of the present application.

What is claimed is:

1. An active grating, comprising:
a first substrate and a second substrate disposed oppositely;
a plurality of first strip electrodes disposed to be spaced from each other with an equal interval on a side of the first substrate facing the second substrate;
a common electrode disposed on a side of the second substrate facing the first substrate, the common electrode comprising a plurality of second strip electrodes disposed corresponding to the plurality of the first strip electrodes one by one;
a light control layer disposed between the plurality of first strip electrodes and the common electrode; and
a driving circuit electrically connected to the common electrode and each of the first strip electrodes respectively,
wherein the driving circuit enables a part of the first strip electrodes to be energized and another part of the first strip electrodes not to be energized, so as to form a plurality of light transmitting region and a plurality of light shielding regions arranged alternately, and
the plurality of light shielding regions correspond to the energized first strip electrodes.

2. The active grating according to claim 1, wherein the light control layer is a liquid crystal layer or an electrochromism layer.

3. A three-dimensional display device, comprising:
a display panel and an active grating disposed oppositely, wherein the active grating comprises:
a first substrate and a second substrate, disposed oppositely; a plurality of first strip electrodes, disposed to be spaced from each other with an equal interval on a side of the first substrate facing the second substrate;
a common electrode, disposed on a side of the second substrate facing the first substrate;
a light control layer, disposed between the plurality of first strip electrodes and the common electrode; and
a driving circuit, electrically connected to the common electrode and each of the first strip electrodes respectively, wherein the driving circuit enables a part of the first strip electrodes to be energized and another part of the first strip electrodes not to be energized, so as to form a plurality of light transmitting region and a plurality of light shielding regions arranged alternately;
a face recognition module, configured to acquire a distance from a current viewer to the active grating;
a first calculating module, in signal connection with the face recognition module, configured to calculate a theoretical horizontal width of each of the light shielding regions when the current viewer see an ideal 3D image at a current position, according to the distance acquired by the face recognition module and a first corresponding relationship between the distance from the current viewer to the active grating and the theoretical horizontal width of each of the light shielding regions of the active grating when the current viewer see the ideal 3D image; and
an adjusting module, in signal connection with the first calculating module and the driving circuit of the active grating respectively, configured to send a corresponding first control instruction to the driving circuit according to the theoretical horizontal width calculated by the first calculating module so as to adjust an actual horizontal width of each of the light shielding regions of the active grating, so that the actual horizontal width equals to the theoretical horizontal width, wherein the actual horizontal widths of the light shielding regions are equal, and the theoretical horizontal widths of the light shielding regions are equal.

4. The three-dimensional display device according to claim 3, wherein the first corresponding relationship is:

$$f = \frac{r \times (n-1) \times p}{r+d}$$

wherein, f is the theoretical horizontal width of each of the light shielding regions for the active grating, r is the distance from the current viewer to the active grating, n is the number of viewpoints of the display panel, p is a width of a sub-pixel in the display panel, and d is the distance between the active grating and the display panel.

5. The three-dimensional display device according to claim 3, further comprising:
a second calculating module, in signal connection with the face recognition module and the adjusting module respectively.

6. The three-dimensional display device according to claim 5, wherein the face recognition module is further configured to acquire a horizontal interval between adjacent viewers in a same row at a light exiting side of the display panel, the second calculating module calculates an offset amount of each of crosstalk regions of the active grating when the current viewers see ideal 3D images according to the horizontal interval between the adjacent viewers and a second corresponding relationship between a maximum horizontal interval of the adjacent viewers and the offset amount of each of the crosstalk regions of the active grating when the current viewers see the ideal 3D images, the adjusting module sends a corresponding second control instruction to the driving circuit according to the offset amount calculated by the second calculating module so as to adjust a relative position of each of the light shielding regions in the active grating, so that each of the crosstalk regions of the active grating corresponds to a middle position between two adjacent viewers.

7. The three-dimensional display device according to claim 6, wherein the second corresponding relationship is:

$$s=n-[N+1/2D]$$

wherein s is the offset amount of each of the crosstalk regions of the active grating, n is the number of viewpoints of the display panel, N is a viewpoint corresponding to one of two adjacent viewers with the maximum horizontal interval, D is a horizontal interval between two viewpoints respectively corresponding to the two adjacent viewers with the maximum horizontal interval.

8. The three-dimensional display device according to claim 5, wherein the first calculating module, the adjusting module and the second calculating module are integrated in same information processing unit.

9. The three-dimensional display device according to claim 3, wherein the face recognition module is disposed at an edge of the display panel and/or an edge of the active grating.

10. The three-dimensional display device according to claim 3, further comprising:
a notification module, in signal connection with the adjusting module and configured to send notification information to the viewers who cannot see the ideal 3D image and inform the viewers of moving to a certain position in order to see the ideal 3D image.

11. The three-dimensional display device according to claim 10, further comprising:
a display module, in signal connection with the notification module and configured to display the notification information to the viewers.

12. A three-dimensional display method for the three-dimensional display device according to claim 3, comprising:

acquiring the distance from the current viewer to the active grating;
calculating a theoretical horizontal width of each of the light shielding regions when the viewer see an ideal 3D image at a current position, according to the distance from the current viewer to the active grating and the first corresponding relationship between the distance from the viewer to the active grating and the theoretical horizontal width of each of the light shielding regions of the active grating when the viewer see the ideal 3D image, wherein the theoretical horizontal widths of the light shielding regions are the same;
sending the corresponding first control instruction to the driving circuit of the active grating, according to the calculated theoretical horizontal width of each of the light shielding regions, and adjusting an actual horizontal width of each of the light shielding regions of the active grating, so that the actual horizontal width equals to the theoretical horizontal width, wherein the actual horizontal widths of the light shielding regions are the same.

13. The three-dimensional display method according to claim 12, wherein the first corresponding relationship is:

$$f = \frac{r \times (n-1) \times p}{r+d}$$

wherein, f is the theoretical horizontal width of each of the light shielding regions for the active grating, r is the distance from the current viewer to the active grating, n is the number of viewpoints of the display panel, p is a width of a sub-pixel in the display panel, and d is the distance between the active grating and the display panel.

14. The three-dimensional display method of claim 12, wherein the sending the corresponding first control instruction to the driving circuit of the active grating, according to the calculated theoretical horizontal width of each of the light shielding regions, and adjusting an actual horizontal width of each of the light shielding regions of the active grating, so that the actual horizontal width equals to the theoretical horizontal width, wherein the actual horizontal widths of the light shielding regions are the same, comprises:
generating the corresponding first control instruction according to the theoretical horizontal width calculated by the first calculating module and sending the corresponding first control instruction to the driving circuit by an adjusting module;
energized a part of first strip electrodes of the active grating and being not energized another part of the first strip electrodes of the active grating according to the first control instruction by the driving circuit, so that a plurality of light shielding regions and a plurality of light transmitting regions arranged alternately are formed, and the actual horizontal width of the generated light shielding region equals to the theoretical horizontal width.

15. The three-dimensional display method according to claim 12, further comprising:
acquiring a horizontal interval between adjacent viewers in a same row at a light exiting side of the display panel;
calculating a offset amount of each of crosstalk regions of the active grating when the viewers see ideal 3D images, according to the horizontal interval between the adjacent viewers and a second corresponding relationship between a maximum horizontal interval between the adjacent viewers and the offset amount of each of the crosstalk regions of the active grating when the viewers see the ideal 3D images;

sending a corresponding second control instruction to the driving circuit according to the calculated offset amount of each of the crosstalk regions, adjusting a relative position of each of the light shielding regions in the active grating , so that each of the crosstalk regions of the active grating corresponds to a middle position between the two adjacent viewers.

16. The three-dimensional display method according to claim 15, wherein the second corresponding relationship is:

$$s=n-[N+1/2D]$$

wherein s is the offset amount of each of the crosstalk regions of the active grating, n is the number of viewpoints of the display panel, N is a viewpoint corresponding to one of two adjacent viewers with the maximum horizontal interval, D is a horizontal interval between two viewpoints respectively corresponding to the two adjacent viewers with the maximum horizontal interval.

17. The three-dimensional display method according to claim 15, wherein the sending a corresponding second control instruction to the driving circuit according to the calculated offset amount, adjusting a relative position of each of the light shielding regions in the active grating, so that each of the crosstalk regions of the active grating corresponds to a middle position between the two adjacent viewers, comprises:

generating the corresponding second control instruction and sending the second control instruction to the driving circuit of the active grating according to the offset amount calculated by the second calculating module by the adjusting module;

energized a part of first strip electrodes of the active grating and being not energized another part of the first strip electrodes of the active grating according to the second control instruction by the driving circuit, so that a plurality of light shielding regions and a plurality of light transmitting regions arranged alternately are formed, the light shielding regions formed after the second control instruction is received are moved left or moved right entirely compared with the light shielding regions formed before the second control instruction is received.

* * * * *